US006426134B1

(12) United States Patent
Lavin et al.

(10) Patent No.: US 6,426,134 B1
(45) Date of Patent: Jul. 30, 2002

(54) SINGLE-WALL CARBON NANOTUBE-POLYMER COMPOSITES

(75) Inventors: John Gerard Lavin, Swarthmore; Harry Vaughn Samuelson, Chadds Ford, both of PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/342,452

(22) Filed: Jun. 29, 1999

Related U.S. Application Data

(60) Provisional application No. 60/091,201, filed on Jun. 30, 1998.

(51) Int. Cl.[7] .......................... B32B 15/08; B32B 5/16; C01B 31/00
(52) U.S. Cl. .............................. 428/300.1; 423/445 B; 428/357; 428/375; 428/378; 428/395
(58) Field of Search ................... 428/403, 407, 428/357, 375, 378, 395, 300.1; 423/445 B

(56) References Cited

U.S. PATENT DOCUMENTS

| 4,663,230 | A | * | 5/1987 | Tennent | 428/367 |
|---|---|---|---|---|---|
| 5,102,647 | A | * | 4/1992 | Yamada et al. | 423/447.3 |
| 5,424,054 | A | | 6/1995 | Bethune et al. | 423/447.2 |
| 5,627,140 | A | * | 5/1997 | Fossheim et al. | 505/401 |
| 5,686,182 | A | * | 11/1997 | Maniar | 428/404 |
| 5,866,434 | A | * | 2/1999 | Massey et al. | 436/526 |
| 6,031,711 | A | * | 2/2000 | Tennent et al. | 361/303 |
| 6,129,901 | A | * | 10/2000 | Moskovits et al. | 423/447.3 |
| 6,183,714 | B1 | * | 2/2001 | Smalley et al. | 423/447.3 |
| 6,187,823 | B1 | * | 2/2001 | Haddon et al. | 516/32 |
| 6,203,814 | B1 | * | 3/2001 | Fisher et al. | 424/443 |
| 6,205,016 | B1 | * | 3/2001 | Niu | 361/503 |

OTHER PUBLICATIONS

Iljima, S. et al., Single–shell carbon nanotubes of 1–nm diameter, *Nature,* 363, 603–605, Jun. 17, 1993.
Guo, T. et al., Catalytic growth of single–walled nanotubes by laser vaporization, *Chemical Physics Letters,* 243, 49–54, 1995.
Thess, A. et al., Crystalline Ropes of Metallic Carbon Nanotubes, *Science,* 273, 483–487, Jul. 26, 1996.
Bethune, D.S. et al., Cobalt–catalysed growth of carbon nanotubes with single–atomic–layer walls, *Nature,* 363, 605–607, Jun. 17, 1993.
Liu, J. et al., Fullerene Pipes, *Science,* 280, 1253–1256, May 22, 1998.

* cited by examiner

*Primary Examiner*—Hoa T. Le

(57) ABSTRACT

This invention relates to single-wall carbon nanotube/polymer composites, a process for the production of such, and their use as fibers, films and articles.

10 Claims, No Drawings

SINGLE-WALL CARBON NANOTUBE-POLYMER COMPOSITES

This application claims priority benefit of U.S. Provisional Application No. 60/091,201 filed Jun. 30, 1998, now pending.

FIELD OF THE INVENTION

This invention relates to single-wall carbon nanotube/polymer composites, a process for the production of such, and their use as fibers, films and articles.

TECHNICAL BACKGROUND

Carbon nanotubes were first reported in 1991 by Sumio Iijima who produced multilayer tubules by evaporating carbon in an arc discharge. These linear fullerenes are attracting increasing interest as constituents of novel nanoscale materials and device structures. Defect-free nanotubes are expected to have remarkable mechanical, electronic and magnetic properties that will be tunable by varying the diameter, number of concentric shells, and chirality of the tube.

In 1993, Iijima's group and an IBM team headed by D. S. Bethune independently discovered that a single-wall nanotube could be made by vaporizing carbon together with a transition metal such as iron or cobalt in an arc generator (see Iijima, et al., Nature, Vol. 363, p. 603, (1993); D. S. Bethune et al., Nature 363 (1993) 605 and U.S. Pat. No. 5,424,054). These syntheses produced low yields of non-uniform nanotubes mixed with large amounts of soot and metal particles.

Richard Smalley et al. in Chem. Phys. Letters, Vol. 243 (1995) 49–54 disclose a process for making single-wall nanotubes having diameters of about 1 nm and lengths of several microns. The nanotubes aggregated into "ropes" in which many tubes were held together by van der Waals forces. The nanotubes produced were remarkably uniform in diameter.

In later work published in Science, Vol. 273 (1996) 483–487, Smalley et al. discuss the addition of a second laser to their process which gives a pulse 50 nanoseconds after the pulse of the first laser. This raised the yield of nanotubes to an estimated range of 70 to 90% and seemingly favored the 10, 10 configuration (a chain of 10 hexagons around the circumference of the nanotube). The product consisted of fibers approximately 10 to 20 nm in diameter and many micrometers long comprising randomly oriented single-wall nanotubes, each nanotube having a diameter of about 1.38 nm.

J. Liu et al. in "Fullerene Pipes", Science, Vol. 280 (1998) 1253 discusses single-wall fullerene nanotubes that are converted from nearly endless, highly tangled ropes into short, open-ended pipes that behave as individual macromolecules. Also described therein is the termination of the open ends of the nanotubes with carboxylic acid groups after treatment in acid. This is followed by reaction with $SOCl_2$ at room temperature to form the corresponding acid chloride.

Because of their unique electronic and mechanical properties, further progress toward new uses of single-wall nanotubes is desirable.

SUMMARY OF THE INVENTION

The present invention relates to a single wall carbon nanotube/polymer composite, comprising a single wall carbon nanotube having at least one end chemically bonded to a polymer.

The present invention also relates to a process for producing a single wall carbon nanotube/polymer composite, comprising the steps of:

(a) contacting single wall carbon nanotubes with an acid, wherein at least a portion of said carbon nanotubes form acid derivatized nanotubes, each of said acid derivatized nanotubes having at least one carboxylic acid attached to at least one end of the nanotube;

(b) contacting the product of step (a) with one or more polymer precursors to form a pre-polymer product; and (c) polymerizing the pre-polymer product of step (b) to form a single wall carbon nanotube/polymer composite.

The present invention further provides a fiber comprising the single wall carbon nanotube/polymer composite described above.

The present invention also provides an article comprising the single wall carbon nanotube/polymer composite described above.

The present invention also provides a film comprising the single wall carbon nanotube/polymer composite described above.

DETAILED DESCRIPTION OF THE INVENTION

In accordance with a first embodiment of the present invention, there is provided a single wall carbon nanotube/polymer composite. The present composite comprises a nanotube component and a polymer component. The nanotube component comprises single wall carbon nanotubes each individually having a length ranging from about 10 to about 300 nm and each nanotube having a diameter ranging from about 1 to about 2 nm. At least one end of a portion of the nanotubes present within the composite is derivatized and chemically bonded to or within one or more chains of a polymer of the polymer component via one or more chemical bonds. Thus, there can be a derivatized nanotube bearing a carboxyl group at one end that can serve as a chain-terminating group of a polymer chain of the polymer component. A nanotube bearing carboxyl groups at both ends is capable of copolymerization and can reside at the end of or within the polymer chain. Thus, the derivatized nanotubes can reside at the end of polymer chains, within the polymer chains, or both. The composites of the present invention can be described as block copolymers in which the nanotubes are the hard segment.

As used herein a single wall carbon nanotube refers to a hollow carbon fiber having a wall consisting essentially of a single layer of carbon atoms. Single wall carbon nanotubes can be made by the processes disclosed in Iijima et al., Nature, Vol. 363, p. 603 (1993); D. S. Bethune et al., Nature 63 (1993) 060, U.S. Pat. No. 5,424,054, R. Smalley et al, Chem. Phys. Letters, Vol. 243 (1995) 49–54 and Science Vol. 273 (1996) 483–487.

The polymer component of the present composite comprises polymers, including copolymers, capable of chemically bonding to a derivatized end of a single wall carbon nanotube or those polymers that can be prepared from one or more monomer precursors capable of bonding with a derivatized end of a single wall carbon nanotube either prior to or during polymerization. Representative examples of polymers comprising the polymer component of the present invention include linear and branched polyamides, polyesters, polyimides and polyurethanes. Preferred polyamides include but are not limited to nylon 6; nylon 6,6; and nylon 6,12. Preferred polyesters include but are not limited to poly(ethylene terephthalate), poly(trimethylene terephthalate), and poly(trimethylene naphthalate).

In accordance with the present invention, there is provided a process for preparing a single wall carbon nanotube/polymer composite. The process comprises the steps of preparing an acid derivatized nanotube, contacting the derivatized nanotube with one or more polymer precursors to form a pre-polymer product and polymerizing the pre-polymer product to form the single wall carbon nanotube/polymer composite.

Prior to forming the acid derivatized nanotube, it may be necessary to cut the nanotubes and optionally purify them. Highly tangled ropes of nanotubes currently available or produced by the methods referenced above can be cut into short lengths of open tubes of about 10 to 300 nm in length. The cut tubes can then be suspended, sorted, and manipulated as individual macromolecules (see Liu et al., Science, Vol. 280, 1253–1256, 1998).

Since the nanotubes produced by the methods currently available may contain impurities, such as bucky onions, spheroidal fullerenes, amorphous carbon, and other material, that are difficult to separate from the nanotubes once they have been cut, it is preferable to purify the nanotube material before cutting. A suitable purification method comprises refluxing in 2.6 M nitric acid and resuspending the nanotubes in pH 10 water with surfactant, such as sodium lauryl sulfate, followed by filtration with a cross-flow filtration system. The resultant purified single wall nanotube suspension can be passed through a polytetrafluoroethylene filter to produce a freestanding mat of tangled single wall nanotube ropes. Preferably, the ropes are not allowed to dry since that can make redispersion more difficult.

Alternatively, purified single wall nanotubes in aqueous suspension can be purchased from Tubes@Rice, MS-100, P.O. Box 1892, Houston Tex. 77251–1892 or Carbolex Inc., ASTeCC Building, University of Kentucky, Lexington, Ky. 40506-0286.

The nearly endless ropes of nanotubes can then be cut to make ends by several techniques ranging from simply cutting with a pair of scissors to bombardment with relativistic gold ions. However, a far more effective and efficient method for cutting is prolonged sonication of the nitric acid-purified single wall nanotube rope material in an oxidizing acid, such as a mixture of concentrated sulfuric and nitric acids, at 40° C.

Before chemically cutting the nanotubes, it is best to remove the surfactant. This can be accomplished by diluting a quantity of the surfactant/water mix with an equal volume of methanol. This mixture can then be centrifuged at about 20,000 g for at least 20 minutes and decanted. This procedure can be repeated adding just as much methanol as was done the first time. Then, the procedure can be repeated again, except that dimethyl formamide (DMF) can be added instead of methanol. Finally, the mixture can be diluted to the desired concentration with DMF. If the solution is thoroughly homogenized after each dilution, this procedure can suspend the nanotubes in DMF. Alternatively, instead of the final suspension in DMF, the nanotubes can be filtered and transferred immediately to the oxidizing acid to commence chemical cutting.

After the nanotubes are cut and after further optional treatment in acid, at least a portion of the open ends of the nanotubes are presumed to be terminated with one or more carboxylic acid groups (see K. Kinoshita, Carbon Electrochemical and Physico-chemical Properties, Wiley, N.Y., 1988, pp. 199–201).

Such acid derivatized carbon nanotubes can be added to and subsequently copolymerized with precursors of polymers including but not limited to monomeric precursors to polyamides, polyesters, polyimides, or polyurethanes. For example, the acid derivatized carbon nanotubes can be contacted with a diacid and a diamine and the resultant pre-polymer product polymerized to form a single wall carbon nanotube/polyamide composite, or the acid derivatized carbon nanotubes can be contacted with a diacid or a diester, and a diol and the resultant pre-polymer product polymerized to form a single wall carbon nanotube/polyester composite.

The diacid can be selected from aliphatic, alicyclic or aromatic diacids. Specific examples of such acids include glutaric acid, adipic acid, suberic acid, sebacic acid, dodecanedioic acid; 1,2- or 1,3-cyclohexane dicarboxylic acid; 1,2-or 1,3-phylene diacetic acid; 1,2- or 1,3-cylohexane diacetic acid; isophthalic acid; terephthalic acid; 4,4'-oxybis (benzoic acid); 4,4'-benzophenone dicarboxylic acid; 2,5-naphthalene dicarboxylic acid; and p-t-butyl isophthalic acid. The preferred dicarboxylic acid for a polyamide component is adipic acid.

The diamine can be aliphatic, alicyclic or aromatic diamines. Specific examples of such diamines include hexamethylene diamine; 2-methyl pentamethylenediamine; 2-methyl hexamethylene diamine; 3-methyl hexamethylene diamine; 2,5-dimethyl hexamethylene diamine; 2,2-dimethylpentamethylene diamine; 5-methylnonane diamine; dodecamethylene diamine; 2,2,4- and 2,4,4-trimethyl hexamethylene diamine; 2,2,7,7-tetramethyl octamethylene diamine; meta-xylylene diamine; paraxylylene diamine; diaminodicyclohexyl methane and $C_2$–$C_{16}$ aliphatic diamines which can be substituted with one or more alkyl groups A preferred diamine is hexamethylene diamine.

Alternative precursors for preparing a polyamide component of a single wall carbon nanotube/polyamide composite include compounds having a carboxylic acid functional group and an amino functional group or a functional precursor to such a compound which compounds include 6-aminohexanoic acid, caprolactam, 5-aminopentanoic acid, 7-aminoheptanoic acid, and the like.

The diacid or diester polymer precursors useful in preparing a polyester component of the present composite, suitably include aliphatic dicarboxylic acids which contain from 4 to 36 carbon atoms, diesters of aliphatic dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, or diesters of alkyl substituted aryl dicarboxylic acids which contain from 11 to 22 carbon atoms. The preferred aliphatic dicarboxylic acids contain from 4 to 12 carbon atoms. Some representative examples of such aliphatic dicarboxylic acids include glutaric acid, adipic acid, pimelic acid and the like. The preferred diesters of alkyl dicarboxylic acids contain from 6 to 12 carbon atoms. The preferred aryl dicarboxylic acids contain from 8 to 16 carbon atoms. Some representative examples of aryl dicarboxylic acids are terephthalic acid, isophthalic acid and orthophthalic acid. The preferred diesters of aryl dicarboxylic acids contain from 10 to 18 carbon atoms. Some representative examples of diesters of aryl dicarboxylic acids include dimethyl terephthalate, dimethyl isophthalate, dimethyl orthophthalate, dimethyl naphthalate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

Diols useful as polymer precursors in the present invention herein suitably comprise glycols containing from 2 to 12 carbon atoms, glycol ethers containing form 4 to 12 carbon atoms and polyether glycols having the structural formula HO—(AO)$_n$H, wherein A is an alkylene group containing from 2 to 6 carbon atoms and wherein n is an integer from 2 to 400. Generally, such polyether glycols will have a molecular weight of about 400 to 4000.

Preferred glycols suitably contain from 2 to 8 carbon atoms, with preferred glycol ethers containing from 4 to 8 carbon atoms. Some representative examples of glycols, which can be employed as a diol polymer precursor, include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propanediol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4,-tetramethyl-1,3-cyclobutane diol, and the like A representative example of polyether glycol is Polymeg® and of polyethylene glycol is Carbowax®.

Preferred polyesters for the polymer component of the present composite include for example, poly(ethylene terephthalate)(PET), poly(ethylene naphthalate)(PEN), poly(trimethylene terephthalate)(3G-T), and poly(trimethylene naphthalate)(3G-N).

Following contact of the acid derivatized carbon nanotubes with the polymer precursors, the pre-polymer product of such contact may be filtered, washed, and dried. For example, this procedure would be appropriate for treatment of the salt precipitate when using polyamide precursors. In addition, for the formation of other pre-polymer products, water or alcohol may be removed such as in the formation of polyester pre-polymers.

The pre-polymer product resulting from the contact of the acid derivatized carbon nanotubes and the polymer precursors can be polymerized under the pressure, temperature and other process conditions suitable for the polymerization of the particular polymer precursors present. This may include the addition of a catalyst. The resultant product comprises a single wall carbon nanotube/polymer composite.

Alternatively, in the process of the present invention, following the step in which the nanotube is acid derivatized, any carboxylic acid groups of the nanotube ends described above can be converted to the corresponding acid chlorides by reactions known by those of skill in the art, such as by contact with SOCl$_2$ at room temperature.

The acid chloride derivatized carbon nanotube can then be contacted with an excess of a diamine. Upon contact with the diamine, such as those listed above, an amine derivatized carbon nanotube can be formed whereby an amide linkage is formed to the nanotube and the free amine on the other end of the nanotube is available for further reaction.

For example, such amine derivatized carbon nanotubes can be contacted with a diacid and a diamine, which can be the same or different from the diamine used to prepare the amine derivatized nanotube, to form a pre-polymer product comprising a polyamide salt. Upon polymerization of the pre-polymer product resulting from the contact of the acid derivatized nanotube with the acid chloride followed by contact with diamine, a single wall carbon nanotube/polyamide composite will result.

Alternatively, the amine derivatized carbon nanotube can be contacted with a pyromellitic dianhydride to form a nanotube/polyimide composite upon polymerization. Similarly, a single wall carbon nanotube/polyurethane composite can be formed by contacting an amine derivatized nanotube with an isocyanate, such as toluene diisocyanate, followed by polymerization.

Further, in accordance with the present invention, there is provided a fiber comprising the nanotube/polymer composite described above. After formation of the nanotube/polymer composite, a fiber can be formed therefrom by cutting the composite material into chips and drying. These chips can then be heated under pressure to bond the chips into a plug. This plug can then be heated to a molten state, passed through a mesh screen, and forced through an extrusion orifice. The filament formed by the molten composite material can then be pulled away from the orifice and wound onto a bobbin. Such fibers can be incorporated into bulked continuous filament yarns and made into carpets. Such carpets have inherent antistatic properties.

Further, in accordance with the present invention, there is provided an article comprising the nanotube/polymer composite described above. After formation of the nanotube/polymer composite, the composite material can be used as an injection moldable resin for engineering polymers for use in applications including solenoid bodies for automotive braking systems.

Further, in accordance with the present invention, there is provided a film comprising the nanotube/polymer composite described above. Preferably, the polymer component of the composite is a polyester. After formation of the nanotube/polymer composite, the composite material can be melt extruded to form a film. Such films are useful in applications including static-free packaging for electronic components.

EXAMPLE 1

Nanotubes (0.1, 1.0 and 5.0 wt % Loading) as a Copolymer with 6,12 Polyamide Derivatized Nanotube Formation Single wall carbon nanotubes are purchased from Tubes@Rice, as a dispersion of 4.5 gm nanotubes/liter. Surfactant is removed by adding a volume of methanol equal to the amount of dispersion to be used. The mixture is then sonicated briefly, centrifuged at 20,000 g's for 20 mins and decanted. A similar volume of methanol is then added, and the process is repeated. The wet nanotubes are then placed in an acid solution containing 3:1 H$_2$SO$_4$ (98%):HNO$_3$ (70%), and vigorously sonicated for 3 hours at 40° C. The nanotubes are then stirred for 1 hour at 70° C., filtered using a 0.2 micron filter, and are washed in deionized water several times, until pH is neutral. The nanotubes are given a final wash in dilute HCl.

In order to convert the carboxylic acid end groups to amine ends, the nanotubes are first dried overnight at 80° C. in a vacuum oven, and immersed in thionyl chloride (10 ml SOCl$_2$ per gm of nanotubes) for a period of 2 hrs to generate acid chloride ends. The nanotubes are then filtered and immersed in aqueous hexamethylene diamine (10 ml 25% hexamethylene diamine per gm of nanotubes) for 30 minutes. The nanotubes are then filtered and washed in deionized water several times until pH is neutral, and maintained in a wet condition for further processing.

Salt Formation 0.1 wt % loading

For 0.1 moles of dodecanedioic acid (DDDA) and hexamethylene diamine (HMD), add 23 grams of DDDA to 120 ml of ethyl alcohol by warming to dissolve, then cool to room temperature; add to this a solution of 11.6 grams of HMD and 0.31 grams of amine derivatized nanotubes in 30 ml of ethyl alcohol and rinse this beaker with two 10 ml aliquot's of ethyl alcohol into the first container. All additions are carried out slowly with stirring. After standing overnight, the precipitate is filtered and washed with 100 ml ethyl alcohol, then dried in a moisture free environment.

1.0 wt % Loading

For a 1.0 wt % loading of nanotubes, follow the procedure above for the 0.1 wt % loading, except use 3.1 grams of the amine derivatized nanotubes. More ethyl alcohol may be needed in the amine solution if it is too pasty.

5.0 wt % Loading

For a 5.0 wt % loading of nanotubes, follow the procedure above for the 0.1 wt % loading, except use 15.5 grams of the amine derivatized nanotubes. More ethyl alcohol may be needed in the amine solution if it is too pasty.

Polymerization

Each of the salts formed above is charged to a separate high pressure polymerization tube which are nitrogen purged of air and sealed under vacuum. The polymerization tubes are then placed in a shielded 215° C. bath for 2 hours. The polymerization tubes are removed from the bath and cooled to room temperature in a shielded environment. The polymerization tubes are opened and the top tubing neck is bent to form a side arm retort at the top, which is connected to a nitrogen-vacuum purging system. Under nitrogen at atmospheric conditions, the polymerization tube is heated at 270° C. for 60 minutes and any reflux is collected through the side arm. Vacuum is then gradually applied to the tube to about 1 mm pressure for about 60 minutes. In order to minimize foaming, the vacuum applied is controlled. Bubble evolution at the end of the 60 minutes should be used to judge polymer viscosity.

Fiber Formation

After copolymerization of the derivatized carbon nanotube as a carboxylic acid and amine co-salt, this material is cut into chips of approximately ⅛ inch size and dried at 120° C. for 16 hours under a reduced pressure with a slow sweep of dry nitrogen through the oven. These chips are placed in a 0.875 inch diameter cylinder, which is heated from 220° C. to 280° C. under pressure to bond the chips into a plug 3.5 inches long. This plug is then heated from 290° C. to 350° C. in a 0.875 inch diameter cylinder, which is fitted with a ram piston on top and an extrusion orifice on the bottom. The orifice is 0.020 inches diameter and 0.020 inches long. Prior to the orifice, the material is passed through a 50 mesh screen, which has five 200 mesh screens preceding it. The filament formed by the molten material is pulled away from the orifice and wound onto a bobbin.

EXAMPLE 2

Nanotubes (1.0 wt % Loading) as Copolymer with Poly(trimethylene terephthalate)

A 250 ml flask equipped with a stirrer and distillation column is charged with 41 g of 1,3-propanediol, and 0.65 g of chemically cut acid derivatized nanotubes are added as a 1% dispersion in methanol. The nanotubes are dispersed in the 1,3 propanediol by stirring for 15 minutes. 58.5 g of dimethyl terephthalate (DMT) is added to give a mole ratio of 1,3-propanediol:DMT of 1.8:1. The flask is then purged with nitrogen and the contents of the flask are heated. When the temperature inside the flask reaches about 150° C. and all of the DMT has melted, the stirrer is started. When the temperature reaches 210° C., 18.4 mg tetraisopropyl titanate (Tyzor® TPT available from E. I. du Pont de Nemours and Company, Wilmington, Del.) is added. The temperature is held at 210° C. for about 90 minutes and the methanol generated is removed as a liquid condensate by distillation.

After evolution of methanol has ceased, the resultant product which includes the monomer, bis(3-hydroxypropyl) terephthalate, is polymerized in the same vessel at a temperature of 250° C. and pressure of 0.5 mm Hg, without additional catalyst. A product comprising a single wall carbon nanotube/poly(trimethylene terephthalate) composite as a resin is obtained. Fiber spinning follows the procedures in Example 1 with appropriate drying of pellets and lower processing temperatures of about 40° C. to adjust for the lower melting point of poly(trimethylene terephthalate).

EXAMPLE 3

Nanotubes (1.0 wt % Loading) as Copolymer with Poly(trimethylene terephthalate), Using Terephthalic Acid as an Intermediate A 250 ml flask equipped with a stirrer and distillation column is charged with 48.7 g of 1,3-propanediol, and 0.5 g of chemically cut acid derivatized nanotubes are added as a 1% dispersion in methanol. The nanotubes are dispersed in the 1,3-propanediol by stirring for 15 minutes. 66.5 g of terephthalic acid (TPA) and 24.4 mg of tetraisopropyl titanate (50 ppm of Ti based on final polymer, 62 ppm of Ti based on TPA) are added for a mole ratio of 1,3-propanediol:TPA of 1.6:1. The flask is then nitrogen purged, the stirrer is started, and the contents of the flask are heated. When the temperature has reached about 210° C., water starts to evolve. The temperature is held at 210° C. for the time it takes to reach a clear solution, which indicates the completion of the esterification reaction. After evolution of water has ceased, the resultant product including the monomer, bis(3-hydroxypropyl)terephthalate is polymerized along with an additional 24.4 mg of tetraisopropyl titanate at a temperature of 250° C. and a pressure of 0.3 mm Hg for 5 hours. The product obtained comprising a single wall carbon nanotube/poly(trimethylene terephthalate) composite as a resin is pelletized. Fiber spinning follows the teaching in Example 2.

EXAMPLE 4

Nanotubes (1.0 wt % Loading) as Copolymer with Poly(ethylene terephthalate)

A 250 ml flask equipped with a stirrer and distillation column is charged with 33.5 g of ethylene glycol, and 0.65 gm of chemically cut acid derivatized nanotubes are added as a 1% dispersion in methanol. The nanotubes are dispersed in the ethylene glycol by stirring for 15 minutes. 58.5 gm of dimethyl terephthalate (DMT) is added to give a mole ratio of ethylene glycol:DMT of 1.8:1. The flask is then purged with nitrogen and the contents of the flask are heated. When the temperature inside the flask reaches about 150° C. and all of the DMT melts, the stirrer is started. When the temperature reaches 210° C., 18.4 mg tetraisopropyl titanate is added. The temperature is held at 210° C. for approximately 90 minutes and the methanol generated is removed as a liquid condensate by distillation.

After evolution of methanol has ceased, the resultant product including the monomer, bis(2-hydroxyethyl) terephthalate, is polymerized in the same vessel at a temperature of 250° C. and pressure of 0.5 mm Hg without additional catalyst to form a single wall carbon nanotube/poly(ethylene terephthalate) resin composite. Making fibers follows the teaching in Example 1.

What is claimed is:

1. A single filament fiber, comprising a melt-extruded single wall carbon nanotube/polymer composite comprising a single wall carbon nanotube having at least one end chemically bonded to a polymer.

2. An article, comprising an injection-molded single wall carbon nanotube/polymer composite comprising a single wall carbon nanotube having at least one end chemically bonded to a polymer.

3. A film, comprising a melt-extruded single wall carbon nanotube/polymer composite comprising a single wall carbon nanotube having at least one end chemically bonded to a polymer.

4. A process for producing a single wall carbon nanotube/polymer composite, comprising the steps of:

(a) contacting single wall carbon nanotubes with an acid, wherein at least a portion of said carbon nanotubes form acid derivatized nanotubes, each of said acid derivatized nanotubes having at least one carboxylic acid attached to at least one end of the nanotube;

(b) contacting the product of step (a) with one or more polymer precursors to form a pre-polymer product; and (c) polymerizing the pre-polymer product of step (b) to form a single wall carbon nanotube/polymer composite.

5. The process of claim 4 wherein the polymer precursors are a diacid and a diamine.

6. The process of claim 5 wherein the diacid is adipic acid or dodecanedioic acid, and the diamine is hexamethylene diamine.

7. The process of claim 4 wherein the polymer precursor is caprolactam.

8. The process of claim 4 wherein the polymer precursors are a diacid or a diester, and a diol.

9. The process of claim 8 wherein the diacid is terephthalic acid and the diol is ethylene glycol or 1,3-propanediol.

10. The process of claim 4, further comprising:

(a)(i) converting the acid derivatized carbon nanotube of step (a) to an acid chloride derivatized carbon nanotube, said acid chloride derivatized carbon nanotube having at least one acid chloride group attached to at least one end of the nanotube; and (a)(ii) contacting the acid chloride derivatized carbon nanotube of step (a)(i) with an excess of a diamine to form an amine derivatized carbon nanotube, said amine derivatized carbon nanotube having at least one amine group attached to at least one end of the nanotube.

* * * * *